Patented May 26, 1925.

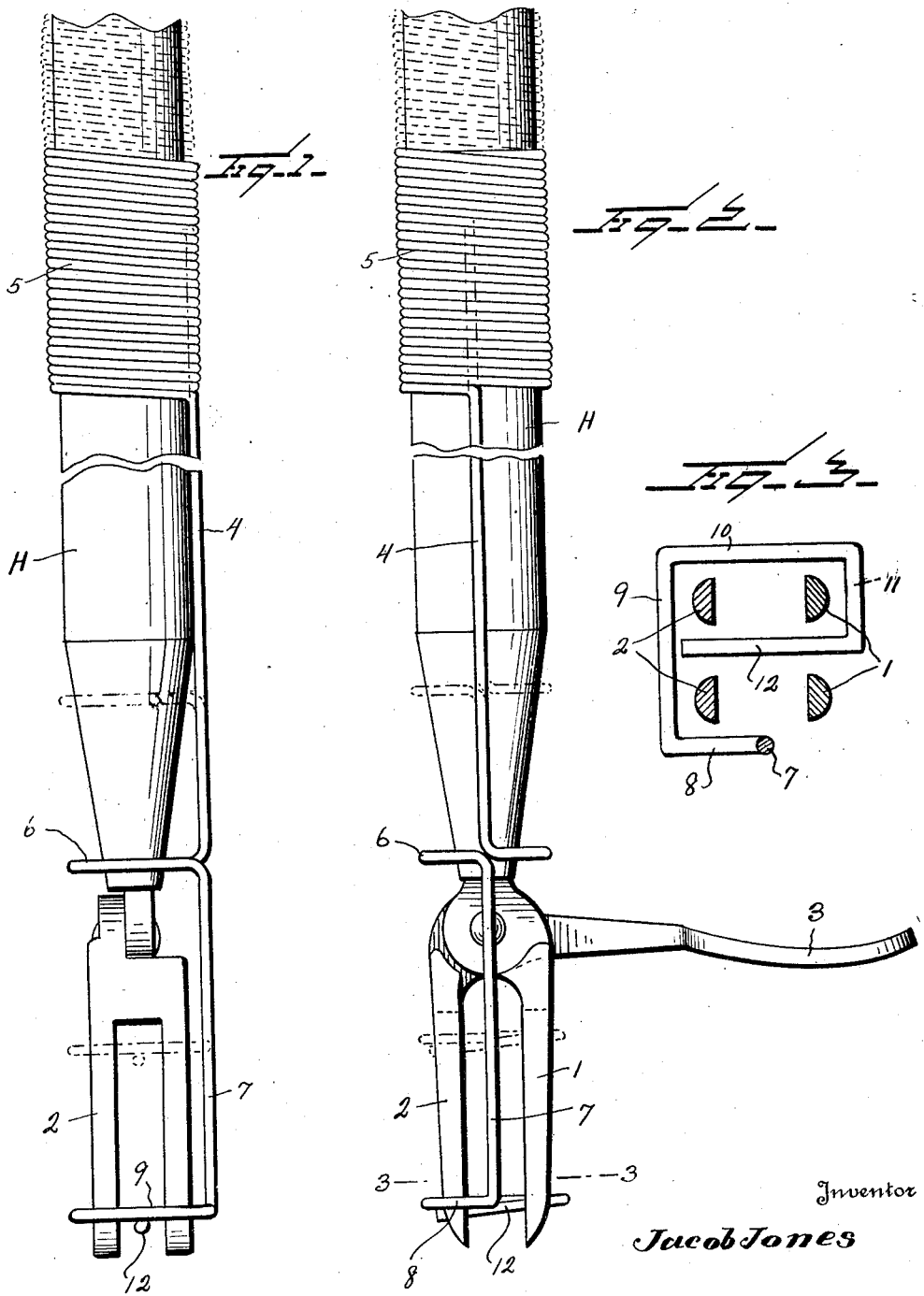

1,539,088

UNITED STATES PATENT OFFICE.

JACOB JONES, OF SEATTLE, WASHINGTON.

CLEANER ATTACHMENT.

Application filed August 9, 1924. Serial No. 731,194.

*To all whom it may concern:*

Be it known that I, JACOB JONES, a citizen of the United States, residing at Seattle, in the county of King and State of Washington, have invented certain new and useful Improvements in Cleaner Attachments, of which the following is a specification, reference being had to the accompanying drawings.

This invention relates to certain improvements in cleaner attachments and has relation more particularly to a device of this general character especially designed and adapted for use in connection with weed pullers, and it is an object of the invention to provide a novel and improved attachment of this kind which is mounted upon the puller in a manner whereby relatively slight movement of the attachment in one direction will free the prongs of the puller of the pulled weeds, roots and earth.

Another object of the invention is to provide a novel and improved attachment operating in a manner wherein is eliminated the necessity of employing the hands to remove the weeds or the like from the prongs and which also obviates the necessity of the operator stooping over.

The invention consists in the details of construction and in the combination and arrangement of the several parts of my improved cleaner attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a front elevational view illustrating a cleaner attachment constructed in accordance with an embodiment of my invention and in applied position, a second position of the cleaner being indicated by broken lines;

Figure 2 is a side elevational view illustrating my improved attachment;

Figure 3 is an enlarged sectional view taken substantially on the line 3—3 of Figure 2.

As disclosed in the accompanying drawings, H denotes a handle of a weed puller which is provided at one end portion with the prongs 1 stationary with respect to the handle H and the prongs 2 carried by said handle H for swinging movement by the prongs 1 so that when said prongs are forced within the earth they may be caused to effectively engage around the roots of the plant being extracted, the operation of the device being facilitated by the pedal 3 co-acting directly with the swinging prongs 2.

While in some instances the plant removed by the puller will drop by gravity from between the prongs 1 and 2 it has been found in practice that in most instances it is required that such pulled plants be removed by hand. In order to clean the prongs of such plants, roots and accompanying earth, I have provided my improved attachment which is formed of a single strand of wire of requisite gauge and which comprises a bar 4 extending lengthwise of the lower end portion of the handle H and coiled at its upper end portion to provide a sleeve or barrel 5 surrounding the handle H and providing means whereby requisite movement may be imparted to the attachment as desired. The opposite end portion of the bar 4 is formed to provide a laterally disposed loop or ring 6 surrounding the handle H and continued by an outwardly disposed bar 7 being substantially a continuity of the bar 4. The bar 7 terminates in a laterally disposed arm 8 continued by the arm 9 substantially at right angles thereto which is positioned outwardly of but closely adjacent to the prongs 2. The arm 9 is continued by the substantially perpendicularly related arm 10 which is arranged outwardly of but in close proximity to a pair of opposed prongs 1 and 2. This arm 10 is continued by the short arm 11 which extends across and outwardly of such prong 1 and is continued by the inwardly disposed arm 12 substantially in parallelism with the arm 10 and terminating closely adjacent the arm 9, said arm 12 working between the prongs 1 and 2 operating effectively to discharge all weeds, roots and earth retained between said prongs after being extracted. The arrangements of the various arms of the attachment with respect to the prongs may be varied.

With the use of my improved attachment the weeds or the like may be effectively discharged between the prongs without the necessity of the operator stooping and furthermore during a working operation a bucket or other container may be positioned in desired proximity to the operator and as the weeds or the like are pulled out the same may be readily delivered within such bucket and thereby obviate the necessity of the operator going back to pick up the extracted plants.

From the foregoing description it is thought to be obvious that a cleaner attachment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a weed puller comprising a handle, a stationary prong and a movable prong, a member supported for sliding movement by the handle, the lower end portion of the member being angularly disposed and extending around the prongs.

2. In combination with a weed puller comprising a handle, a stationary prong and a movable prong, a member supported for sliding movement by the handle, the lower end portion of the member being angularly disposed and extending around the prongs, and a laterally disposed loop surrounding the handle.

3. In combination with a weed puller comprising a handle, a stationary prong and a movable prong, a member supported for sliding movement by the handle, the lower end portion of the member being angularly disposed and extending around the prongs, the inner end portion of the member being formed into a barrel surrounding the handle.

4. In combination with a handle provided with a pair of stationary prongs and a pair of movable prongs, a member slidably supported by the handle, the outer end portion of the member being provided with angularly related arms disposed around certain of the prongs.

5. In combination with a handle provided with a pair of stationary prongs and a pair of movable prongs, a member slidably supported by the handle, the outer end portion of the member being provided with angularly related arms disposed around certain of the prongs, one of the arms being disposed between each pair of prongs.

In testimony whereof I hereunto affix my signature.

JACOB JONES.